United States Patent

[11] 3,559,999

[72] Inventor Norwood Kenneth Perkins
Lexington, Ky.
[21] Appl. No. 783,526
[22] Filed Dec. 13, 1968
[45] Patented Feb. 2, 1971
[73] Assignee International Business Machines Corporation
Armonk, N.Y.
a corporation of New York

[54] MAGNETIC HEAD POSITIONER FOR RECORDING AND REPRODUCING APPARATUS
12 Claims, 2 Drawing Figs.

[52] U.S. Cl. .......... 274/4, 179/100.2
[51] Int. Cl. .......... G11b 5/52, G11b 21/04

[50] Field of Search .......... 179/100.2CA, 100.2MI, 100.2T; 274/4A, 4.2, 11E, (Cursory)17, 20—22

[56] References Cited

UNITED STATES PATENTS

| | | | |
|---|---|---|---|
| 3,376,396 | 4/1968 | Bradt .......... | 179/100.2 |
| 3,251,263 | 5/1966 | Gerry .......... | 179/100.2 |
| 3,163,486 | 12/1964 | Tomes .......... | 179/100.2 |

*Primary Examiner*—J. Russell Goudeau
*Attorneys*—Hanifin and Clark and Frank C. Leach, Jr.

ABSTRACT: A magnetic head, which has an erase gap and a record-playback gap, is movable in opposite directions across a recording medium and always has its erase gap positioned in advance of the record-playback gap irrespective of the direction of movement of the head.

N. KENNETH PERKINS
INVENTOR

BY Frank C. Leach Jr.

ATTORNEY

MAGNETIC HEAD POSITIONER FOR RECORDING AND REPRODUCING APPARATUS

In recording and reproducing apparatuses of the type in which a magnetic head scans the magnetic-recording medium in a line-by-line relation, the direction of movement of the magnetic head is reversed at the end of each line of scanning. Of course, it also is necessary to step the magnetic head relative to the recording medium at the end of each line of scanning in order that another of the lines of the recording medium may be scanned by the magnetic head during movement in the opposite direction.

When the magnetic head is of the type in which an erase gap is disposed adjacent to a record-playback gap so that erasure of any previously recorded material may occur before recording material on the recording medium, it is necessary for the erase gap to always precede the record-playback gap during movement across the recording medium. This permits any previously recorded material to be erased so that the dictator may correct any errors or record over previously recorded material.

Therefore, if it is desired to utilize a magnetic head having an erase gap adjacent to a record-playback gap so that a dictator may correct errors or use a recording medium having previously recorded material thereon, it is necessary that the erase gap always precede the record-playback gap during movement of the magnetic head. Otherwise, error-free dictation cannot occur.

The present invention satisfactorily solves the foregoing problem by providing a magnetic head, which has both an erase gap and a record-playback gap, with means to maintain the erase gap forward of the record-playback gap irrespective of the direction in which the magnetic head moves. The present invention employs means to rotate the head 180° at the end of its scanning motion in either direction.

An object of this invention is to provide a recording reproducing apparatus having a magnetic head, which has an erase gap and a record-playback gap, for scanning a recording medium in which the erase gap is always forward of the record-playback gap irrespective of the direction of movement of the magnetic head.

Another object of this invention is to provide a device for positioning a magnetic head of a recording reproducing apparatus of the scanning type so that the magnetic head has its erase gap always forward of the record-playback gap irrespective of the direction of movement of the magnetic head.

The foregoing and other objects, features, and advantages of the invention will be more apparent from the following more particular description of the preferred embodiments of the invention as illustrated in the accompanying drawing.

Figures 1, 2:
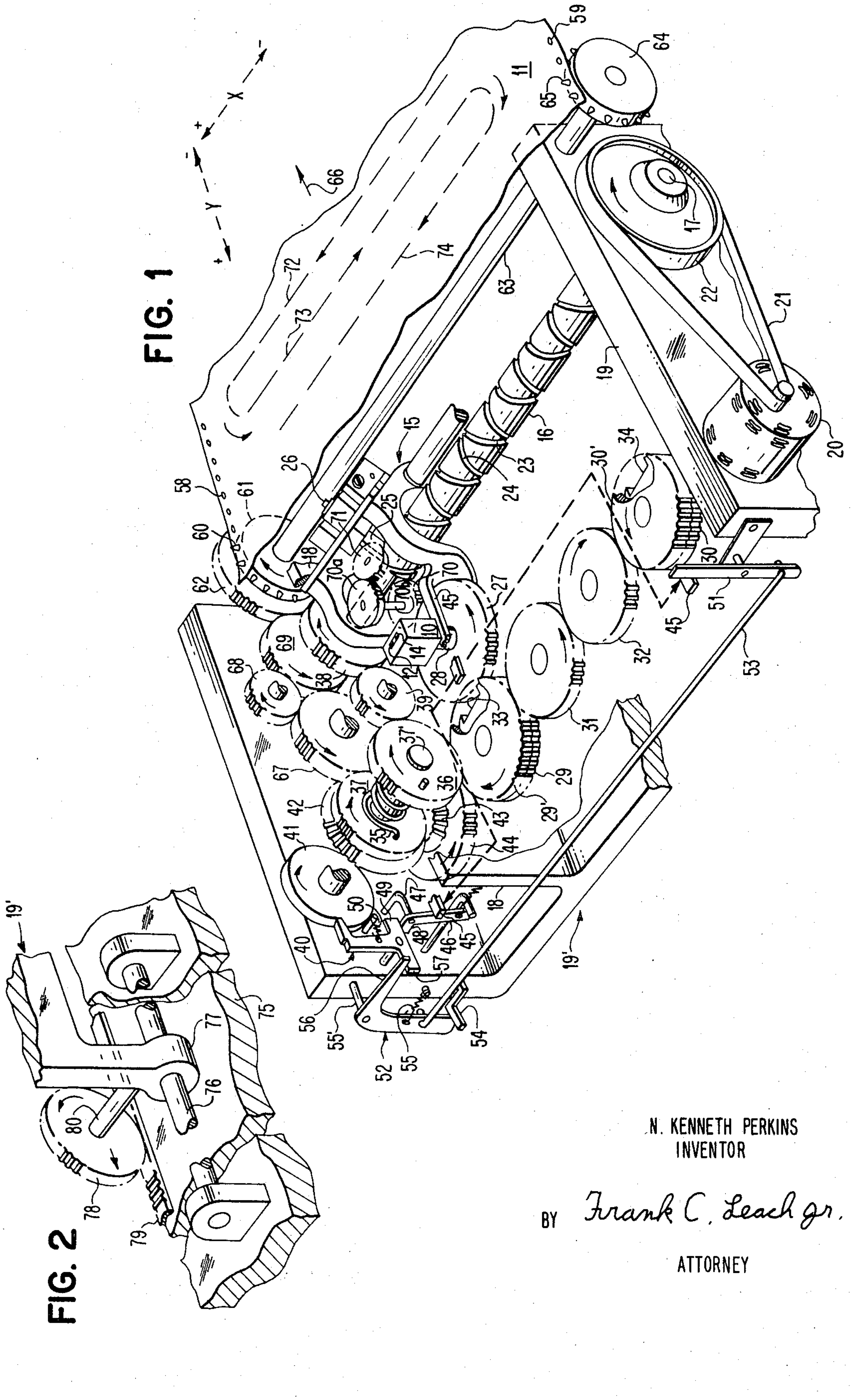
FIG. 1 is a schematic perspective view of a recording and reproducing apparatus employing the magnetic head positioner of the present invention.
FIG. 2 is a perspective view of a modification of a portion of the structure of FIG. 1.

Referring to the drawing and particularly FIG. 1, there is shown a magnetic head 10 for both recording information on a magnetic-recording medium 11 and reproducing information recorded on the magnetic-recording medium 11 for listening purposes. The magnetic head 10 includes an erase gap 12 and a record-playback gap 14, which are disposed adjacent each other. During recording, the erase gap 12 has its winding energized so that the erase gap 12 is effective as well as the record-playback gap 14 being effective. However, during playback, the erase gap 12 is not effective as its winding is not energized while the record-playback gap 14 is effective.

The magnetic head 10 is mounted on a carrier 15, which is adapted to be moved transversely relative to the recording medium 11 by a double threaded lead screw 16 such as a lead screw of the "fishing reel" type. This transverse movement of the carrier 15 is in the X direction. The lead screw 16 has its shaft 17 journaled in portions 18 and 19 of a stationary support frame 19'.

The lead screw shaft 17 is rotated by a motor 20, which is supported by the frame 19', through a belt 21 cooperating with a pulley 22, which is disposed on one end of the shaft 17. Accordingly, rotation of the motor 20 continuously rotates the shaft 17 in one direction.

The lead screw 16 has spiral grooves 23 and 24 formed therein to receive a follower 25, which is rotatably mounted by a shaft 26 on the carrier 15. When the follower 25 is disposed in the groove 24, the carrier 15 advances in the X+ direction in FIG. 1 while disposition of the follower 25 in the groove 23 results in the carrier 15 advancing in the X− direction in FIG. 1.

The grooves 23 and 24 intersect with each other along their lengths. At each end of the lead screw 16, there is a cut away portion at the intersection permitting the direction of movement of the follower 25 to change from one of the grooves 23 to the other of the grooves 24 and vice versa at each end of movement of the carrier 15 in one of the X directions. When the carrier 15 reaches the end of its travel in either direction, it must be given an impetus in the opposite direction to cause the follower 25 to move from one of the grooves 23 and 24 to the other of the grooves 23 and 24 to reverse the direction of movement of the carrier 15.

When scanning in a line-by-line arrangement as the magnetic head 10 does with respect to the recording medium 11, it is necessary to be able to also step the head 10 relative to the medium 11. This direction of movement will be referred to as the Y direction. Thus, either the magnetic head 10 or the recording medium 11 must be capable of being stepped in the Y direction at each end of movement of the magnetic head 10 in the X direction relative to the recording medium 11.

When using the magnetic head 10 with the erase gap 12 and the record-playback gap 14, it is necessary to always have the erase gap 12 precede the record-playback gap 14 in the direction of movement. This is necessary to provide error-free dictation.

Accordingly, when the head 10 reaches each end of its travel in the X direction, it is rotated 180° to change the position of the erase gap 12 with respect to the record-playback gap 14 so that the erase gap 12 again precedes the record-playback gap 14. Thus, when the head 10 is moving in the X+ direction, the erase gap 12 is in front of the record-playback gap 14. When the end of the groove 24 is reached by the follower 25, the head 10 is rotated 180° counterclockwise to dispose the erase gap 12 with respect to the record-playback gap 14 so that the erase gap 12 precedes the record-playback gap 14 as the head moves in the x− direction. When the head 10 completes its movement in the X− direction, it is rotated clockwise 180° to again position the erase gap 12 in front of the record-playback gap 14 during movement of the head 10 in the x+ direction.

The magnetic head 10 is rotated by rotation of a gear 27, which has its shaft 28 attached to the magnetic head 10. The shaft 28 is rotatably mounted in the carrier 15 whereby the magnetic head 10 is rotatable relative to the carrier 15 whenever the gear 27 is rotated.

The magnetic head 10 preferably rotates about the record-playback gap 14. Thus, the axis of the shaft 28 is aligned with the center of the record-playback gap 14 of the magnetic head 10.

When the head 10 completes movement in the X+ direction and counterclockwise rotation of the magnetic head 10 is desired, the gear 27 is rotated counterclockwise by a gear 29, which has a gear 29' integral therewith and disposed thereabove. When the head 10 reaches the end of its travel in the X− direction, clockwise rotation of the head 10 is desired. This is accomplished by meshing the gear 27 with a gear 30, which has a gear 30' integral therewith and disposed thereabove. The gear 30' meshes with the gear 29' through idler gears 31 and 32. Thus, the gears 29 and 30 rotate in opposite directions.

In order that the gear 27 may move relative to both the gears 29 and 30, the gear 29 has a cut out portion 33 on its periphery and the gear 30 has a cut out portion 34 on its periphery. Each of the portions 33 and 34 does not have any teeth therein and is so oriented that the portions 33 and 34 are disposed as shown in FIG. 1 when the magnetic head 10 completes each rotation.

It should be understood that the magnetic head 10 must be held against rotation when the gear 27 is not being driven. Accordingly, suitable detent means (not shown) must be employed to retain the head 10 against rotation unless the gear 27 is being rotated by either the gear 29 or the gear 30. One suitable example of the detent means would be a resiliently biased detent on the carrier 15 disposed in one of a pair of diametrically disposed notches in the shaft 28. Thus, the gear 27 would be rotated with sufficient force to remove the detent from the notch by overcoming the force of the resilient biasing means.

The gears 29 and 30 are driven whenever an energy storing means such as spring 35 is released. The spring 35, which functions as a motive means when released, has one end attached to a gear 36 while its other end is attached to a gear 37, which is rotatably mounted on a shaft 37' that has the gear 36 fixed thereto. The gear 36 is continuously driven in a clockwise direction from the shaft 17 of the lead screw 16 through a gear 38, which is fixed to the shaft 17, and an idler gear 39. Thus, as long as the gear 37 is prevented from rotating, the spring 35 is wound tighter to store energy therein from the lead screw shaft 17.

The gear 37 is released only when a single revolution clutch is actuated through causing a resiliently biased clutch pawl 40 to be moved away from engagement with a clutch plate 41, which is formed integral with the gear 37. Thus, when the clutch plate 41 is released, the spring 35 causes clockwise rotation of the gear 37.

A bevel gear 42 is formed integral with the gear 37 and meshes with a bevel gear 43, which is formed integral with a gear 44. The gear 44 meshes with the gear 29'. According, whenever the clutch plate 41 is released, both the gears 29 and 30 will rotate a single revolution. The clutch pawl 40 returns into engagement with the clutch plate 41 to stop rotation after a single revolution.

The clutch pawl 40 is actuated by an arm 45 on the carrier 15 as the carrier 15 completes its travel in each X direction. When the carrier 15 completes its movement in the X+ direction, the arm 45 engages a resiliently biased lever 46 to cause clockwise pivoting of the lever 46 about its support pin 47, which is mounted on the frame 19'. When this occurs, an arm 48 of the lever 46 engages an arm 49 of the clutch pawl 40 to cause counterclockwise pivoting of the clutch pawl 40 against the force of a spring 50. As a result, the clutch pawl 40 is disengaged from the clutch plate 41 to allow rotation of the gear 37 due to the energy stored in the spring 35.

Because of the cooperation of the grooves 23 and 24, the carrier 15 starts movement in the X− direction when it ceases to move in the X+ direction whereby the arm 45 is removed from engagement with the lever 46. As a result, the clutch pawl 40 is returned to the position in which it engages the clutch plate 41 before the single revolution of the gear 37 is completed. This insures that there will be no further rotation of the gears 29 and 30 at this time.

When the carrier 15 completes its movement in the X− direction, the arm 45 engages a pivotally mounted arm 51, which is connected to a pivotal lever 52 by a link 53. The lever 52 is resiliently biased against a stop 54 on the frame 19' by a spring 55.

Accordingly, when the arm 45 on the carrier 15 engages the arm 51 to pivot the arm 51 clockwise, the lever 52 is pivoted clockwise about its mounting pin 55', which is on the frame 19', against the force of the spring 55 and away from the stop 54 whereby arm 56 of the lever 52 engages an arm 57 of the clutch pawl 40. As a result, the clutch pawl 40 is pivoted counterclockwise against the force of the spring 50 and ceases to hold the clutch plate 41 against rotation whereby the spring 35 again causes the gears 29 and 30 to rotate a complete revolution. At this time, the gear 27 is in engagement with the gear 30 whereby the magnetic head 10 is rotated clockwise to again properly position the erase gap 12 forward of the record-playback gap 14. Because of the cut out portion 34 in the gear 30, the gear 27 may easily move into and away from the gear 30 when the gear 30 is not rotating.

When the magnetic head 10 completes its movement in each of the X+ and X− directions, it is necessary to step the magnetic head 10 and the recording medium 11 relative to each other to provide another line of the magnetic recording medium 11 for recording or listening by means of the magnetic head 10. Accordingly, as shown in FIG. 1, the magnetic recording medium 11 is stepped in the Y− direction while the magnetic head 10 remains stationary insofar as the Y direction is concerned.

Accordingly, to produce stepping of the recording medium 11, opposite sides of the recording medium 11 are formed with apertures 58 and 59. Pins 60, which are mounted on a wheel 61 that is integral with a gear 62, extend into the apertures 58 to form a driving engagement therewith. A shaft 63, which is rotatably mounted in the frame 19', extends from the wheel 61 to a wheel 64, which has pins 65 thereon for engagement with the apertures 59 in the recording medium 11. Accordingly, when the gear 62 is rotated, the recording medium 11 is advanced in the Y− direction as indicated by arrow 66.

The gear 62 is driven whenever the clutch plate 41 is released from the clutch pawl 40. Thus, the recording medium 11 is stepped relative to the head 10 in the Y− direction only when the magnetic head 10 is being rotated at the end of its movement in one of its X+ and X− directions. The gear 62 is driven by the spring 35 through the gear 37 by means of idler gears 67, 68, and 69.

In addition to the spring 35 causing rotation of the magnetic head 10 and stepping of the magnetic recording medium 11 in the Y− direction, the spring 35 also may cause the follower 25 to be rotated when it reaches the end of one of the grooves 23 and 24 of the lead screw 16 and is ready to enter the other of the grooves. Accordingly, the gear 27 meshes with an idler gear 70, which is rotatably supported on the carrier 15. The idler gear 70 has a bevel gear **70*a* connected therewith by a shaft 70*b* so that the bevel gear 70*a* rotates with the idler gear 70. The bevel gear 70*a* meshes with a bevel gear 71, which is shown secured to the follower 25 although it could be connected to the follower shaft 26. Thus, whenever the gear 27 is rotated by the spring 35, the follower 25 is rotated sufficiently to cause it to move from one of the grooves 23 and 24 into the other of the grooves 23 and 24. Accordingly, the follower 25 is positively driven from one of the grooves 23 and 24 into the other of the grooves 23 and 24 when the follower 25 reaches each end of the lead screw 16**.

Considering the operation of the present invention, the head 10 is shown completing its movement in the X+ direction with the follower 25 still in engagement with the groove 24 in the lead screw 16. As the head 10 nears completion of its movement in the X+ direction, the arm 45 on the carrier 15 engages the lever 46 to cause the clutch pawl 40 to release the clutch plate 41. As a result, the spring 35, which has been wound during movement of the magnetic head 10 from one side of the recording medium 11 to the other in the X direction, rotates the gear 37 clockwise. This causes counterclockwise rotation of the gear 27 whereby the magnetic head 10 rotates counterclockwise.

By properly selecting the size relation of the teeth of the gears 29 and 27, a complete revolution of the gear 29 results in rotation of the gear 27 through 180°. This insures that the erase gap 12 is now disposed forward of the record-playback gap 14 when the head 10 moves in the X− direction.

When the gear 37 rotates, it not only causes rotation of the gear 29 but also causes rotation of the gear 62. Accordingly, the magnetic recording medium 11 is advanced in the Y− direction as indicated by the arrow 66 while the magnetic head 10 is rotated. Thus, if the magnetic head 10 was moving along line 72 on the magnetic recording medium 11, the head 10 changes its direction to now be moving along line 73.

When the gear 27 rotates, it also causes rotation of the follower 25 to cause it to be moved from the groove 24 into the groove 23 in coordination with rotation of the lead screw 16 by the motor 20. Thus, the carrier 15 starts to move in the X− direction to cause the head 10 to move along the line 73 on the recording medium 11.

As the carrier 15 moves in the X− direction, the arm 45 ceases to engage the lever 46 whereby the pawl 40 is again urged by the spring 50 to a position in which it stops rotation of the clutch plate 41 after one revolution thereof. At this time, the gear 29 stops in the position shown in FIG. 1 whereby the cut out portion 33 is disposed in alignment with the gear 27. Thus, driving of the gear 27 actually ceases shortly before rotation of the clutch plate 41 is stopped by the clutch pawl 40.

When the head 10 moves adjacent the portion 19 of the frame 19′, the arm 45 engages the pivotally mounted arm 51 to again cause the clutch pawl 40 to be released from engagement with the clutch plate 41. As a result, the spring 35, which has been wound during movement of the head 10 in the X− direction by the lead screw 16, is unwound to again cause clockwise rotation of the gear 37. This causes rotation of both of the gears 29 and 30.

Since the gear 27 is now disposed adjacent the gear 30, the gear 27 will be rotated clockwise when the magnetic head 10 is disposed adjacent the portion 19 of the frame 19′. Clockwise rotation of the gear 27 not only causes the erase gap 12 to again be disposed in front of the record-playback gap 14 when the head 10 moves in the X+ direction but also causes rotation of the follower 25 in the opposite direction to move the follower 25 from the groove 23 into the groove 24. When this occurs, the carrier 15 starts to move in the X+ direction for recording along line 74 on the recording medium 11.

As the carrier 15 begins to move away from the portion 19 of the frame 19′, the arm 45 ceases to engage the arm 51. As a result, the clutch pawl 40 is no longer held out of engagement with the clutch plate 41 and returns to stop the clutch plate 41 at the completion of one revolution. This results in stopping of the rotation of the gear 30.

The gear 30 stops so that the cut out portion 34 is disposed as shown in FIG. 1. In this position, the gear 27 may now be moved away from the gear 30.

Accordingly, the magnetic head 10 records on the medium 11 along the line 74. The stepping of the medium 11 and the reversal of the direction of the head 10 continues until recording of the entire recording medium 11 is completed.

As previously mentioned, the recording medium 11 could be stationary and the head 10 could be stepped relative thereto in the Y direction to produce the same recording as indicated in FIG. 1. It would be necessary for the frame 19′ to be moved in the Y+ direction.

In such an arrangement, the gear 62 and the wheels 61 and 64 including their pins 60 and 65 would be ommitted along with the apertures 58 and 59 in the medium 11. The medium 11 would then be mounted on a stationary frame 75, which would have the frame 19′ for the carrier 15 movably supported thereon by suitable means such as rods (one shown at 76) on opposite sides of the stationary frame 75 and bushings (one shown at 77) on the frame 19′ slidably mounted on the rods 76.

As shown in FIG. 2, a gear 78 would be utilized and mesh with a rack 79, which would be fixed to the stationary frame 75 on which the recording medium 11 is supported. The gear 78 would be rotatably mounted on a stud 80, which would be fixed to the frame 19′. It also would be necessary for the gear 78 to mesh with the idler gear 68 rather than with the idler gear 69 or the idler gear 68 could be omitted. In either case, it is necessary for the gear 78 to rotate counterclockwise to produce movement of the frame 19′ in the Y+ direction.

Accordingly, whenever the gear 78 is rotated due to the spring 35 being released through the clutch pawl 40 being disengaged from the clutch plate 41, there is stepping of the frame 19′ relative to the recording medium 11 whereby the head 10 steps in the Y+ direction. This produces the same path of recorded material on the recording medium 11 as is shown in FIG. 1.

While the present invention has been described as having the follower 25 positively driven from the spring 35 whenever the spring 35 is released, it should be understood that such is not necessary for operation of the present invention. It would only be necessary for the carrier 15 to engage against a resilient member on each of the portions 18 and 19 of the frame 19′. Thus, when the carrier 15 engaged against one of the resilient members, it would rebound in the opposite direction a sufficient extent to cause the follower 25 to move from one of the grooves 23 and 24 into the other of the grooves 23 and 24.

Likewise, instead of utilizing the spring 35 to cause the stepping of the medium 11 relative to the head 10 or vice versa, it should be understood that this could be accomplished by a completely separate mechanism if desired. Thus, the present invention may be utilized where only the head 10 is rotated 180° at each end of the travel of the head 10.

While the present invention has described the axis of the shaft 28 as being aligned with the record-playback gap 14, it should be understood that such is not mandatory for satisfactory operation of the present invention. For example, the axis of the shaft 28 could be aligned with the erase gap 12 or be disposed at some position between the erase gap 12 and the record-playback gap 14.

While the present invention has described the motive means for rotating the head 10 as being the spring 35, it should be understood that any other suitable motive means could be employed. It is only necessary that there be energy available at each end of movement of the head 10 in the X direction to cause rotation thereof. For example, the gear 27 could be rotated by means mounted on the carrier 15 and rotatable a predetermined amount at each end of travel of the magnetic head 10 in the X direction.

While the present invention has described the carrier 15 as moving relative to the recording medium 11 in the X direction, it should be understood that the magnetic head 10 could be held stationary and the recording medium 11 moved in the X direction. This would necessitate mounting the recording medium 11 for movement by the lead screw 16 rather than the head 10.

It should be understood that the shafts for the gears 29, and 29′, 30 and 30′, 31, 32, 36, 38, 39, 43 and 44, 62, 67, 68, and 69 are supported on the frame 19′. Thus, each of the foregoing gears rotates relative to the frame 19′ by being supported thereby.

An advantage of this invention is that it insures error-free dictation in recording and reproducing apparatuses of the type in which line-by-line recording is obtained through reversing direction of movement of the magnetic head at the end of each line. Another advantage of this invention is that it insures that the direction of the head is reversed at the end of each scanning line of a recording medium.

While the invention has been particularly shown and described with reference to preferred embodiments thereof, it will be understood by those skilled in the art that the foregoing and other changes in form and details may be made therein without departing from the spirit and scope of the invention.

I claim:

1. A recording and reproducing apparatus including:
- a magnetic head having an erase gap, and a record-playback gap;
- means to move said magnetic head and a recording medium relative to each other whereby said magnetic head scans the recording medium in alternate directions;
- means to step said magnetic head and the recording medium relative to each other in a direction substantially normal to the scanning direction when scanning of the recording medium by said magnetic head in each of the alternate directions is completed and in the same stepping direction at the end of each scan;

and means to maintain said erase gap in advance of said record-playback gap during scanning irrespective of the direction of scanning.

2. The apparatus according to claim 1 in which said maintaining means includes means to rotate said magnetic head 180° at the completion of scanning of the recording medium by said magnetic head in each direction.

3. A recording and reproducing apparatus including;

a magnetic head having an erase gap and a record-playback gap;

means to move said magnetic head and a recording medium relative to each other, whereby said magnetic head scans the recording medium in alternate directions;

said moving means comprises means to move said magnetic head while the recording medium is stationary;

means to change the direction of movement of said moving means for said magnetic head at the completion of scanning in each direction;

means to step said magnetic head and the recording medium relative to each other when scanning of the recording medium by said magnetic head in each of the alternate directions is completed;

and means to maintain said erase gap in advance of said record-playback gap during scanning irrespective of the direction of scanning.

4. The apparatus according to claim 3 in which:

said maintaining means includes means to rotate said magnetic head 180° after completion of scanning of the recording medium by said magnetic head in each direction;

and said rotating means is responsive to said moving means for said magnetic head on completion of scanning in one of the alternate directions to rotate said magnetic head.

5. The apparatus according to claim 4 in which said rotating means includes means actuated by said moving means for said magnetic head to rotate said magnetic head 180°.

6. The apparatus according to claim 4 in which, said rotating means includes:

motive means to rotate said magnetic head when said motive means is activated;

and means to activate said motive means upon completion of scanning by said magnetic head in one of the alternate directions.

7. The apparatus according to claim 4 in which said rotating means includes means to cause said stepping means to be effective when said rotating means is rotating said magnetic head.

8. The apparatus according to claim 4 in which, said rotating means includes:

energy storing means to rotate said magnetic head when said energy storing means is released;

means to release said energy storing means upon completion of scanning by said magnetic head in one of the alternate directions;

and said moving means for said magnetic head includes means to cause storing of energy in said energy storing means during scanning of the recording medium by said magnetic head.

9. The apparatus according to claim 8 in which said stepping means includes means driven by said energy storing means when said energy storing means is released.

10. The apparatus according to claim 8 in which, said moving means for said magnetic head includes;

a double threaded lead screw having a pair of spiral grooves therein and extending in opposite directions;

a follower cooperating with each of said grooves in said lead screw, said follower moving in one direction when disposed in one of said grooves and in an opposite direction when disposed in the other of said grooves;

and a carrier connected to said follower, said carrier rotatably supporting said magnetic head;

and said changing means moving said follower from one of said grooves in said lead screw to the other and vice versa to change the direction of movement of said carrier.

11. The apparatus according to claim 10 in which said changing means includes means driven by said energy storing means when said energy storing means is released.

12. The apparatus according to claim 11 in which said stepping means includes means driven by said energy storing means when said energy storing means is released.

UNITED STATES PATENT OFFICE
CERTIFICATE OF CORRECTION

Patent No. 3,559,999 Dated February 2, 1971

Inventor(s) Norwood Kenneth Perkins

It is certified that error appears in the above-identified patent and that said Letters Patent are hereby corrected as shown below:

Column 1, lines 5, 60 and 61, after "magnetic", each occurrence, cancel the hyphen; lines 37 and 44, after "record each occurrence, insert a hyphen. Column 2, line 48, after "head" insert -- 10 --; lines 48 and 53, "x", each occurrence should read -- X --. Column 3, line 37, "According" should re -- Accordingly --. Column 5, line 55, "ommitted" should read -- omitted --. Column 6, line 45, cancel the comma; line 65, after "having" insert a colon; same line 65, "an erase gap" should be a new sub-paragraph; same line 65, cancel the comma and insert a semi-colon; lines 65 and 66, "and a record-playback gap;" should be a new sub-paragraph. Column 7, line cancel the comma, and insert a colon; lines 38 and 39, "said rotating means includes;" should be a new paragraph. Column 8 line 8, cancel the comma, and insert a colon; lines 8 and 9, " rotating means includes;" should be a new paragraph; line 22, cancel the comma, and insert a colon; lines 22 and 23, "said moving means for said magnetic head includes" should be a new paragraph; line 23, cancel the semi-colon, and insert a colon line 24, "a", first occurrence, should be the start of a sub-paragraph; line 26, "a" should be the start of a sub-paragrap line 30, "and" should be the start of a sub-paragraph.

Signed and sealed this 7th day of September 1971.

(SEAL)
Attest:

EDWARD M.FLETCHER,JR.
Attesting Officer

ROBERT GOTTSCHALK
Acting Commissioner of Pater